Figure 1:
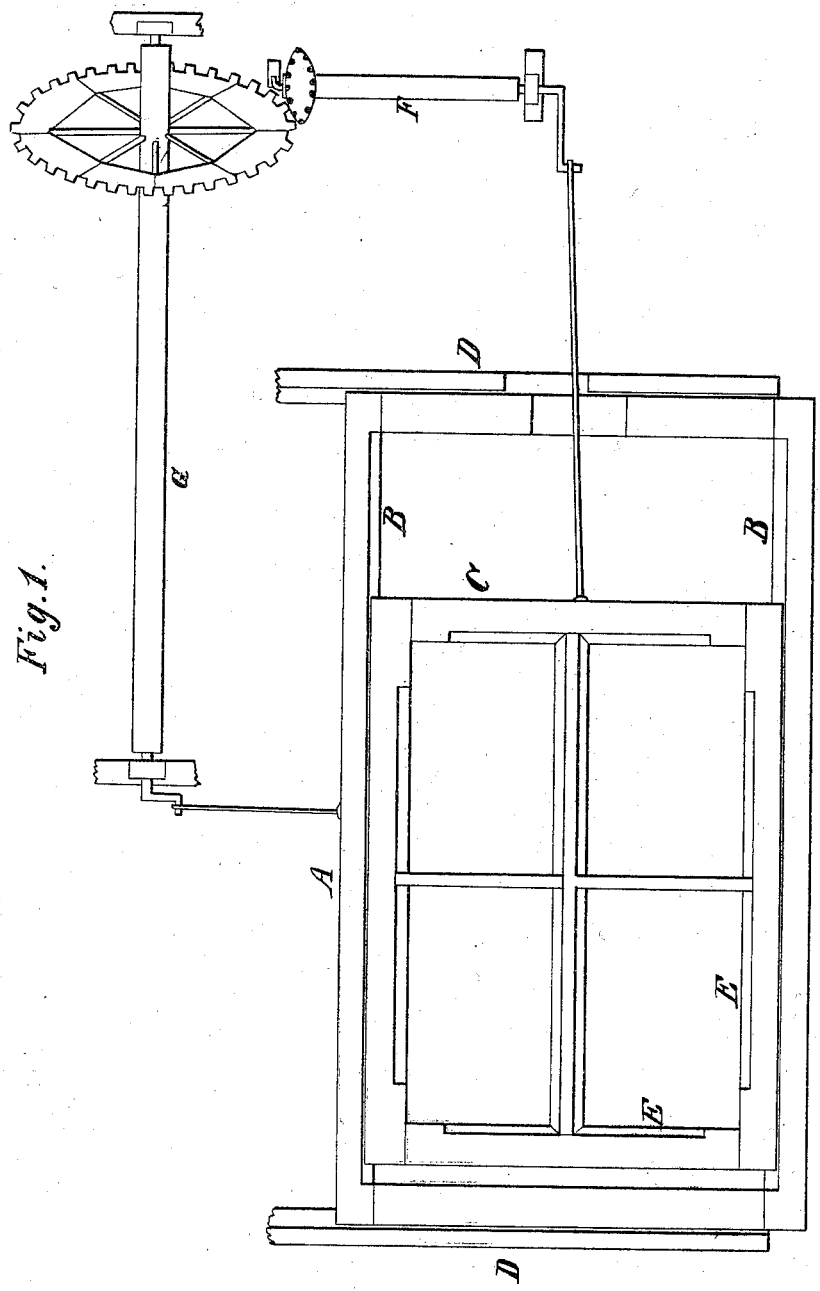

2 Sheets—Sheet 1.

A. WALTER.
MACHINE FOR POLISHING STONE.

No. 7,354. Patented May 7, 1850.

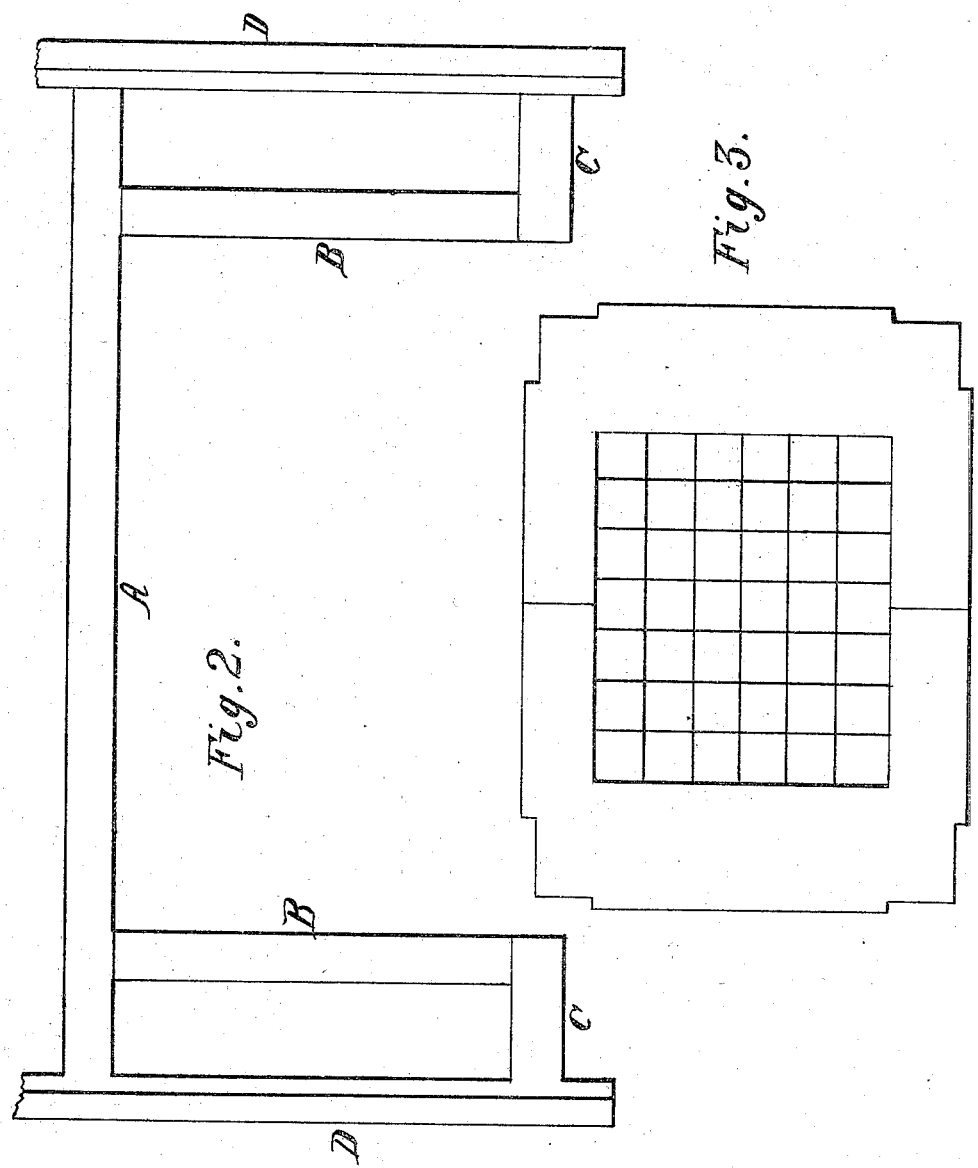

UNITED STATES PATENT OFFICE.

AMOS WALTER, OF MIDDLETOWN, INDIANA.

MACHINE FOR POLISHING STONE.

Specification of Letters Patent No. 7,354, dated May 7, 1850.

*To all whom it may concern:*

Be it known that I, AMOS WALTER, of Middletown, in the county of Shelby and State of Indiana, have invented a new and useful Machine for Rubbing and Polishing Stone, which I call a "Double-Carriage Self-Regulating Stone Rubber and Polisher"; and I do hereby declare that the following is a full, clear, and exact description of the construction and operation of the same, reference being had to the annexed drawings, making a part of this specification, in which—

Figure 1 is a representation of the machine when put together ready for operation. Fig. 2 is the bed or frame in which the stones are placed when dressing. Fig. 3 a light board frame to hold the polishers while polishing the stones.

B, A, B, in Fig. 2, is a square frame 10 by 15 ft., in the clear, or any other size to suit the fancy and convenience of the builder. Said frame is left open on one side for convenience in getting stone in, and out the side timbers A and C, extend some 3 or 4 feet beyond the end timbers so as to reach timbers D, and D, on which the carriages run. The light shade on the inside of timbers D D, represents a rabbet about four inches square the bottom of said rabbets being about one inch higher than timbers A, and C, so as to raise the carriages high enough not to touch the frame containing the bed stones. Said bed is made deep enough to admit of the thickest stone that may have to be dressed, the thinner stones are leveled up by placing timbers or plank under them so as to have the top or face of the bed of stone when laid ready for rubbing level, and raised a little above the frame stones of any size, even as large as the bed can be dressed in this machine.

A, in Fig. 1 is a carriage made of timbers 8 or 10 inches square or of sufficient size to give strength. Said carriage is about 8 inches wider than the frame on which it runs as represented by Fig. 2, and long enough for the ends to rest on the rabbets in timbers D, Fig. 2, as shown by timbers D Fig. 1.

B, B, represents a rabbet about 4 inches square made in the side timbers on the inside as carriage A, in which runs carriage C, or inside carriage.

C, in Fig. 1 represents a carriage that runs on the inside of carriage A, resting on the rabbets B, B. A rabbet is taken out of the under side of carriage C, which fits down on the rabbets in carriage A, so as the undersides of said carriages will be level. The light shades at the ends and sides, on the inside at carriage C, see E, E, represent small rabbets, in which the ends of cross timbers rest placed in for the purpose of confining the rubbers. Said timbers are made to move at pleasure, and as many can be used as occasion requires. If said carriages are large and consequently heavy, they should run on small cast iron wheels to cause them to run light.

F, in Fig. 1 represents a horizontal shaft, on one end of which is a small wheel, from 12 to 18 inches in diameter, and on the other end a crank from one to two feet long, regulated by the length of the motion desired to give to carriage C, from said crank is a pitman extending to carriage C. Said small wheel works into a large wheel from three to seven times the diameter of the small one but the cogs not an exact multiple of those in the small one, as shown by the wheel on shaft G. The end of shaft G, extends opposite the center of carriage A, and on the end of said shaft is a short crank about one third as long as the crank on shaft F, from which a pitman extends to carriage A.

The rubbers are placed in the inside carriage and when those wheels are put in motion, a compound motion is given to said rubbers, by means of said two carriages and cranks, a long quick end motion by means of the inside carriage and long crank and small wheel and a short, slow, side motion by means of the outside carriage and short crank, and large wheel, so that all parts of said stones will become rubbed alike. The motion of the carriages may be made longer or shorter by having the wrist of the cranks movable up and down the arms of the cranks.

Fig. 3 is a frame made of boards and the whole frame large enough to fit the inside of carriage C. Said frame is made shallow, so that when polishing stone are placed in the square that they will extend above the top of the frame so that weights may be placed on them, the space in said frame containing said polishers should be enough smaller than the bed of stones so that when polishing the motion of the carriages will not carry them over the edge of the bed stones, for if so the polishers being small would fall out of the frame when the stone are sufficiently rubbed the rubbers are taken out of the carriage and frame Fig. 3 is placed in the carriage and the polishers applied, the machine set to running, and in a short time a beautiful polish will be given to the stone. While rubbing said stone they may be supplied by sand and water in any of the ordinary ways of putting sand and water on stones, none of the modes of which do I hereby claim as my invention.

What I claim as my invention is—

The manner or mode of giving a compound or double motion to the rubbers by means of two carriages or a double carriage, substantially in the manner and for the purpose herein described, each carriage moved by its respective cranks so that one motion of said rubbers will not interfere with the other motion. Said machine can be propelled by any power now in use.

AMOS WALTER.

Witnesses:
JAMES BAILEY,
C. H. MADISON.